United States Patent
Marsolek et al.

(10) Patent No.: US 12,409,829 B2
(45) Date of Patent: Sep. 9, 2025

(54) SUPPRESSING SWITCHING OPERATION OF A MACHINE FROM AN ELECTRIC MODE TO AN ENGINE MODE

(71) Applicant: Caterpillar Paving Products Inc., Brooklyn Park, MN (US)

(72) Inventors: John Marsolek, Watertown, MN (US); Ryan J. Nelson, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 338 days.

(21) Appl. No.: 18/151,808

(22) Filed: Jan. 9, 2023

(65) Prior Publication Data

US 2024/0227774 A1  Jul. 11, 2024

(51) Int. Cl.
*B60W 20/13* (2016.01)
*B60W 20/15* (2016.01)
*B60W 50/14* (2020.01)

(52) U.S. Cl.
CPC ............ *B60W 20/13* (2016.01); *B60W 20/15* (2016.01); *B60W 50/14* (2013.01); *B60W 2510/244* (2013.01); *B60W 2556/45* (2020.02); *E01C 2301/00* (2013.01)

(58) Field of Classification Search
CPC ...... B60W 20/13; B60W 20/15; B60W 50/14; B60W 2510/244; B60W 2556/45; E01C 2301/00
USPC .......................................................... 701/22
See application file for complete search history.

(56) References Cited

U.S. PATENT DOCUMENTS

| | | | |
|---|---|---|---|
| 6,697,717 B2 | 2/2004 | Shioda et al. | |
| 8,615,342 B2 | 12/2013 | Suganuma et al. | |
| 9,994,120 B2* | 6/2018 | Yu | B60L 53/62 |
| 10,155,513 B2 | 12/2018 | Pietron et al. | |
| 10,449,953 B2 | 10/2019 | Choi | |
| 10,611,258 B2 | 4/2020 | Symanow et al. | |
| 10,829,108 B2 | 11/2020 | Kim et al. | |
| 10,894,482 B2 | 1/2021 | Follen et al. | |
| 11,519,353 B2* | 12/2022 | Hesketh | F02M 26/47 |
| 11,669,089 B2* | 6/2023 | Urano | B60W 10/30 701/36 |
| 2015/0217779 A1 | 8/2015 | Schmoll Genannt Eisenwerth et al. | |
| 2021/0094438 A1 | 4/2021 | Ciccone et al. | |
| 2021/0139014 A1* | 5/2021 | Zhao | B60W 30/188 |

(Continued)

FOREIGN PATENT DOCUMENTS

| | | |
|---|---|---|
| DE | 102011002306 A1 | 10/2012 |
| DE | 102016206743 A1 | 10/2017 |

(Continued)

*Primary Examiner* — Andrew Joseph Rudy

(57) ABSTRACT

A control system may include a control of a user interface and a controller. The controller may be configured to cause a machine to operate in a first mode, the machine being configured for hybrid operation in the first mode using a battery without using an internal combustion engine or in a second mode using the internal combustion engine when a level of the battery is below a threshold. The controller may be configured to receive an input, via the control, indicating that the second mode of the machine is to be disabled. The controller may be configured to cause, based on the input and when the level of the battery is below the threshold, suppression of operation of the machine in the second mode.

20 Claims, 3 Drawing Sheets

(56) References Cited

U.S. PATENT DOCUMENTS

| | | | |
|---|---|---|---|
| 2021/0156351 A1 | 5/2021 | Harmeyer et al. | |
| 2021/0162883 A1 | 6/2021 | Shinohara et al. | |
| 2022/0089142 A1 | 3/2022 | Yokoyama et al. | |
| 2023/0087055 A1* | 3/2023 | Berkooz | B60W 50/14 |
| | | | 701/22 |
| 2023/0264678 A1* | 8/2023 | Ogawa | H01M 10/425 |
| | | | 701/22 |

FOREIGN PATENT DOCUMENTS

| | | |
|---|---|---|
| EP | 3333036 B1 | 2/2021 |
| EP | 3839436 A1 | 6/2021 |
| JP | 2000204996 A | 7/2000 |
| JP | 3092403 B2 | 9/2000 |

\* cited by examiner

300 ⟶

310 — Cause a machine to operate in a first mode, the machine being configured for hybrid operation in the first mode using a battery without using an internal combustion engine or in a second mode using the internal combustion engine when a level of the battery is below a threshold

312 — Receive an input indicating that the second mode is to be disabled

320 — Determine that the level of the battery is below the threshold

330 — Selectively cause the machine to switch from operating in the first mode to operating in the second mode based on whether an input indicating that the second mode is to be disabled is received

332 — Cause, based on receiving the input indicating that the second mode is to be disabled and when the level of the battery is below the threshold, suppression of operation of the machine in the second mode

334 — Receive an indication to operate the machine in the second mode after suppression of operation of the machine in the second mode, and cause, based on the indication, operation of the machine in the second mode

336 — Determine that a condition for permitting the second mode of the machine to be enabled is satisfied, and enable or accept, based on satisfaction of the condition, a subsequent input indicating that the second mode of the machine is to be enabled

FIG. 3

SUPPRESSING SWITCHING OPERATION OF A MACHINE FROM AN ELECTRIC MODE TO AN ENGINE MODE

TECHNICAL FIELD

The present disclosure relates generally to hybrid electric machines and, for example, to suppressing switching operation of a machine from an electric mode to an engine mode.

BACKGROUND

A machine may include a battery that powers systems, such as a propulsion system and a work implement system, of the machine to enable operation of the machine in a fully electric mode (e.g., without use of an internal combustion engine). The machine may also include an internal combustion engine. When a charge level of the battery is below a threshold, the engine may automatically turn on to charge the battery or power the machine directly, thereby facilitating uninterrupted operation of the machine. Such a machine capable of operating in a fully electric mode and using an internal combustion engine may be referred to as a "hybrid electric machine." Automatic starting of an internal combustion engine of a machine may prevent operator control over emissions produced by the machine, may consume excessive fuel, may increase wear to the engine, or the like. Moreover, in some examples, a machine that is used at a particular work site may be required to produce zero emissions, and automatic starting of an internal combustion engine produces emissions in contravention of that requirement even though the machine may be capable of zero-emission operation.

U.S. Pat. No. 10,829,108 (the '108 patent) discloses controlling engine operation of a hybrid electric vehicle. In particular, the '108 patent discloses that when it is determined that an engine or a catalytic converter is cold, that a vehicle is parked in an indoor garage, and that a state of charge of a battery is enough for an electric vehicle mode, a controller does not start the engine in response to a driver's command to start the vehicle and the vehicle drives without operating the engine. However, the '108 patent does not disclose suppressing operation of the engine when the battery level is below a threshold (e.g., not enough for the electric vehicle mode).

The control system of the present disclosure solves one or more of the problems set forth above and/or other problems in the art.

SUMMARY

A control system may include a control of a user interface and a controller. The controller may be configured to cause a machine to operate in a first mode, the machine being configured for hybrid operation in the first mode using a battery without using an internal combustion engine or in a second mode using the internal combustion engine when a level of the battery is below a threshold. The controller may be configured to receive an input, via the control, indicating that the second mode of the machine is to be disabled. The controller may be configured to cause, based on the input and when the level of the battery is below the threshold, suppression of operation of the machine in the second mode.

A method may include causing, by a controller, a machine to operate in a first mode, the machine being configured for hybrid operation in the first mode using a battery without using an internal combustion engine or in a second mode using the internal combustion engine when a level of the battery is below a threshold (as used herein, the term "level" refers to a charge level of a battery, as determined in any appropriate manner). The method may include determining, by the controller, that the level of the battery is below the threshold. The method may include selectively causing, by the controller, the machine to switch from operating in the first mode to operating in the second mode based on whether an input indicating that the second mode is to be disabled is received.

A machine may include a battery and an internal combustion engine. The machine may be configured for hybrid operation in a first mode using the battery without using the internal combustion engine or in a second mode using the internal combustion engine when a level of the battery is below a threshold. The machine may include a controller configured to cause the machine to operate in the first mode. The controller may be configured to receive an input, via a user interface associated with the machine, indicating that the second mode of the machine is to be disabled. The controller may be configured to cause, based on the input and when the level of the battery is below the threshold, suppression of operation of the machine in the second mode.

BRIEF DESCRIPTION OF THE DRAWINGS

FIG. 3 is a flowchart of an example process associated with suppressing switching operation of a machine from an electric mode to an engine mode.

DETAILED DESCRIPTION

This disclosure relates to a control system, which is applicable to any machine capable of hybrid operation in a first mode using a battery without using an internal combustion engine or in a second mode using the internal combustion engine. For example, the machine may be a paving machine, a compactor machine, a cold planer, a grading machine, a backhoe loader, a wheel loader, a harvester, an excavator, a motor grader, a skid steer loader, a tractor, a dozer, a vehicle, or the like.

Figure 1:
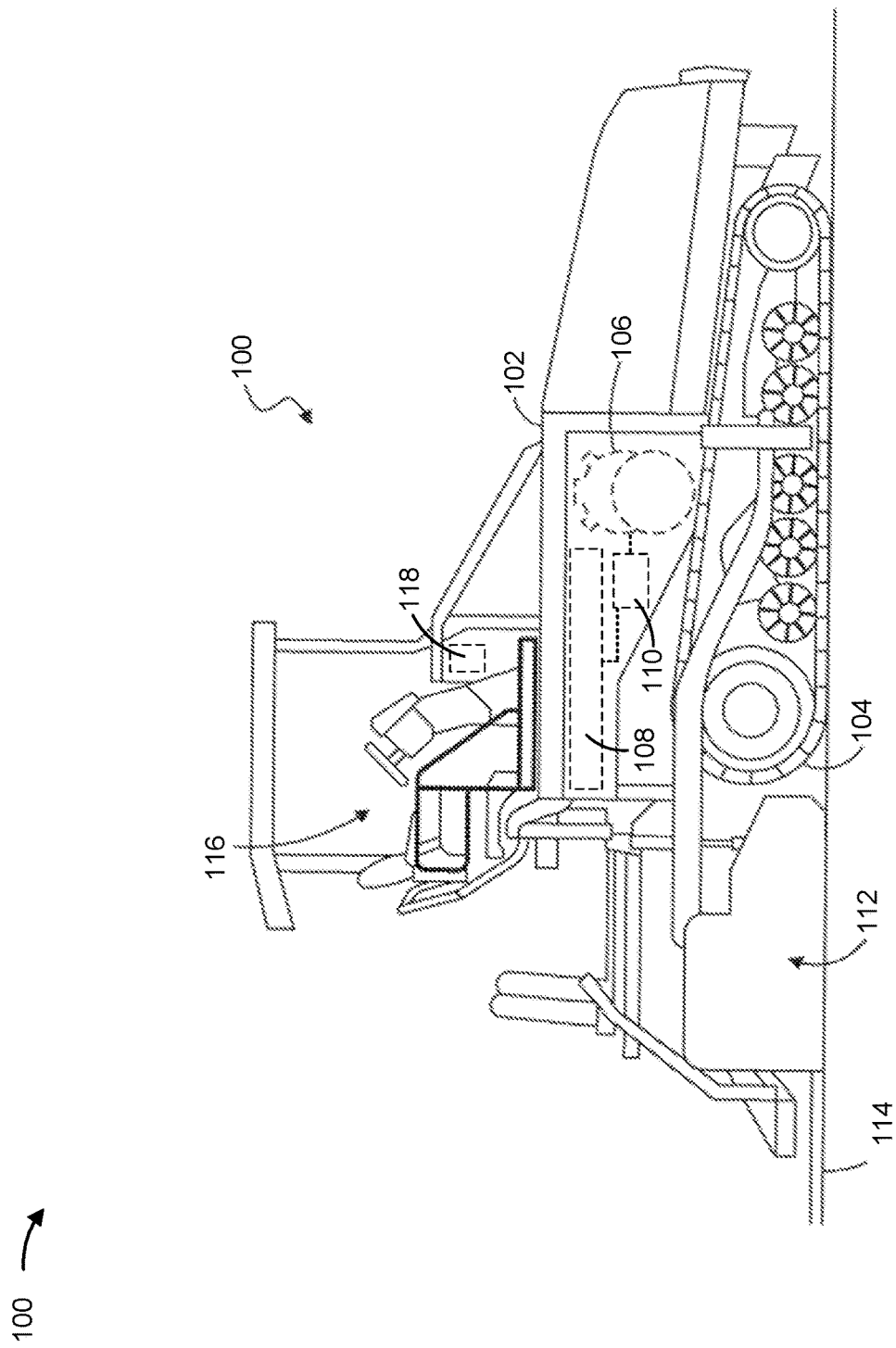
FIG. 1 is a diagram illustrating an example machine.

FIG. 1 is a diagram illustrating an example machine 100. In FIG. 1, the machine 100 is depicted as a paving machine, however, the machine 100 may be another type of machine, as described herein.

The machine 100 includes a frame 102, and a set of ground-engaging elements 104, such as tracks and/or wheels, coupled with the frame 102. The machine 100 may be configured for hybrid operation. For example, the machine 100 may be a hybrid electric machine (e.g., that includes a hybrid drivetrain) that combines an internal combustion engine 106 (e.g., a diesel engine or a gasoline engine) with an electric propulsion system (e.g., including one or more electric motors) powered by a battery 108. The engine 106 and the battery 108 are supported by the frame 102. The ground-engaging elements 104 may be driven by the engine 106 and/or the electric propulsion system (e.g., concurrently or at different times). The engine 106 and/or the electric propulsion system may power other systems of the machine 100, such as a work implement. In some implementations, the machine 100 includes an electrical generator 110 (i.e., an alternator) coupled to the engine 106 and the battery 108. The engine 106 may drive the electrical generator 110 to charge the battery 108.

The machine 100 includes a screed assembly 112. The screed assembly 112 may be positioned at a rear end of the machine 100 to spread and compact paving material (e.g., asphalt) into a mat 114. The machine 100 includes an operator station 116 having a seat and a console, which may include various controls for directing operations of the machine 100. For example, the operator station 116 may include a touchscreen capable of displaying a user interface that includes one or more virtual controls (e.g., buttons, switches, levers, or the like). Additionally, or alternatively, a user interface of the operator station 116 may include one or more mechanical controls.

The machine 100 includes a controller 118 (e.g., an electronic control module (ECM)). The controller 118 may be a hybrid operation controller of the machine 100. The controller 118 may include one or more memories and one or more processors that implement operations associated with hybrid operation of the machine 100, as described in connection with FIG. 2.

As indicated above, FIG. 1 is provided as an example. Other examples may differ from what is described with regard to FIG. 1.

Figure 2:
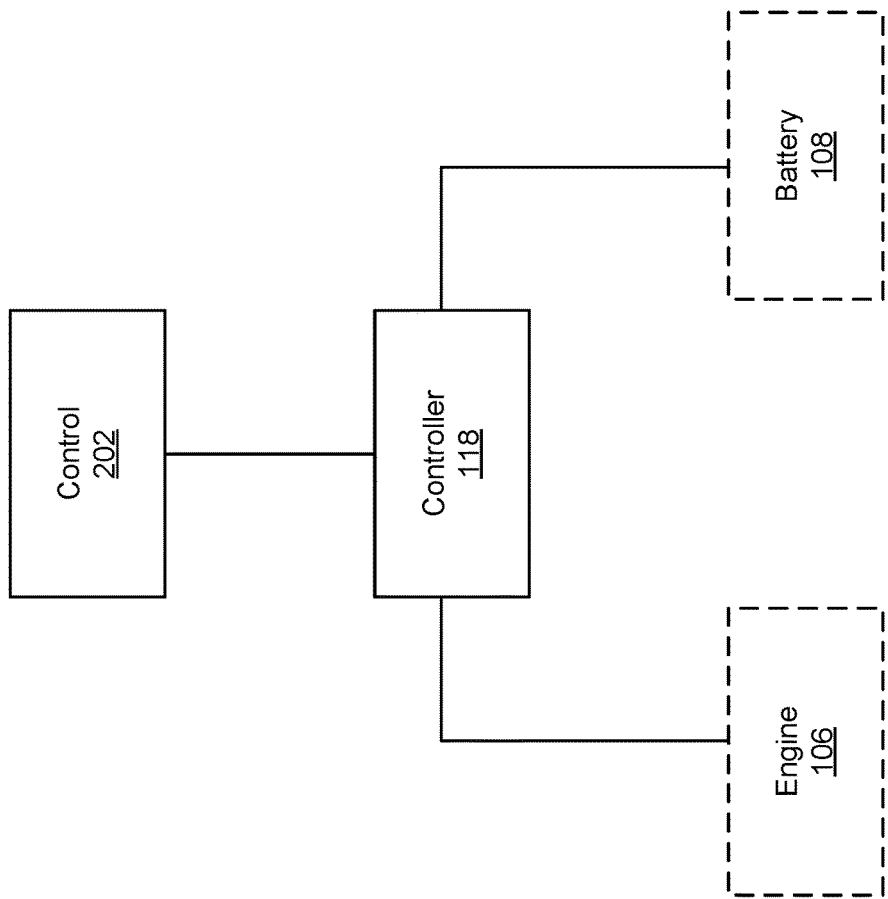
FIG. 2 is a diagram illustrating an example control system.

FIG. 2 is a diagram illustrating an example control system 200. The control system 200 may include the controller 118 and a control 202. The control 202 may be included in a user interface (e.g., a mechanical user interface or a digital user interface). The control system 200 may provide control of hybrid operation of the machine 100. In hybrid operation, the machine 100 may operate in a first mode (referred to herein as an "electric mode") using the battery 108 without using the engine 106 (e.g., the battery 108 may be used to power an electric propulsion system) or in a second mode (referred to herein as an "engine mode") using the engine 106 (e.g., the engine 106 is turned on to charge the battery 108 and/or power the machine 100 directly) when a level (e.g., a charge level) of the battery 108 is below a threshold. In other words, if the battery 108 is sufficiently charged, then the machine 100 may operate in the first mode. Otherwise, the machine 100 may operate in the second mode. The controller 118 (e.g., the one or more memories and/or the one or more processors of the controller 118) may be configured to perform operations described in FIG. 2.

When the machine 100 is started, the controller 118 may cause the machine 100 to operate in the electric mode (provided that the level of the battery 108 is equal to or above the threshold). In some implementations, the controller 118 may monitor an amount of time (e.g., a quantity of machine hours) that the machine 100 operates in the electric mode. For example, the controller 118 may monitor the amount of time that the machine 100 operates in the electric mode and a total amount of time (e.g., a quantity of machine hours) that the machine 100 is operating.

The controller 118 may receive an input indicating that the engine mode of the machine 100 is to be disabled. The controller 118 may receive the input via a user interface associated with the machine 100 (e.g., the input may be a manual input). For example, the controller 118 may receive the input via the control 202. In some examples, the user interface (e.g., the control 202) may be on board the machine 100 (e.g., in operator station 116). In some other examples, the user interface (e.g., the control 202) may be on a device remote from the machine 100 (e.g., a back office device, a user device associated with a supervisor, or the like).

The input indicating that the engine mode is to be disabled may be provided by an individual associated with the machine 100 (e.g., an operator, a supervisor, or the like) via the control 202 (e.g., a button, a switch, a lever, or the like).

The individual may provide the input indicating that the engine mode is to be disabled because the machine 100 is operating in an area (e.g., a work site) associated with a requirement of zero emissions. Thus, when the engine mode is disabled, the machine 100 may be considered an electric-only machine or a zero emissions machine, such that the machine 100 may operate in the area associated with the requirement of zero emissions.

Responsive to receiving the input indicating that the engine mode is to be disabled, the controller 118 may perform one or more actions to record that the engine mode is to be disabled. For example, the controller 118 may set a flag indicating that the engine mode is disabled. In some implementations, the controller 118 may receive, via the user interface, an indication of a target proportion of time (e.g., a target proportion of machine hours) that the machine 100 is to operate in the electric mode. The controller 118 may receive the indication of the target proportion of time contemporaneously with, prior to, or after the input indicating that the engine mode is to be disabled.

The controller 118 may determine that the level of the battery 108 is below the threshold for switching from operating in the electric mode to operating in the engine mode. For example, the threshold may represent a charge level of the battery 108 at which the battery 108 has insufficient charge to support operation of the machine 100 in the electric mode. The controller 118 may be configured to provide a command to cause the machine 100 to switch from operating in the electric mode to operating in the engine mode when the level of the battery 108 is below the threshold.

The controller 118 may selectively cause the machine to switch from operating in the electric mode to operating in the engine mode based on whether the input indicating that the engine mode is to be disabled is received. If the input indicating that the engine mode is to be disabled is not received by the controller 118, then the controller 118 may cause switching from the electric mode to the engine mode when the level of the battery 108 is below the threshold. If the input indicating that the engine mode is to be disabled is received by the controller 118, then the controller 118 may not cause switching (e.g., may refrain from causing switching) from the electric mode to the engine mode when the level of the battery 108 is below the threshold. For example, the controller 118 may cause, based on the input indicating that the engine mode is to be disabled and when the level of the battery 108 is below the threshold, suppression of operation of the machine 100 in the engine mode. To suppress operation of the machine 100 in the engine mode, the controller 118 may block, ignore, or refrain from providing a command to switch from the electric mode to the engine mode, which the controller 118 may be configured to otherwise provide when the level of the battery 108 is below the threshold. In this way, emissions of the machine 100 may be suppressed.

In some implementations, responsive to receiving the input indicating that the engine mode is to be disabled, the controller 118 may determine an estimated time (e.g., a time duration or a time of day and date) at which the level of the battery 108 is to be below the threshold. The controller 118 may transmit, prior to the estimated time, a request for recharging the battery 108. As described below, such recharging can be performed by components other than the engine 106, meaning the engine mode can remain disabled. Additionally, or alternatively, the controller 118 may transmit the request for recharging the battery 108 responsive to detecting that the level of the battery is below a recharging threshold (e.g., that is higher than the threshold for switching from the electric mode to the engine mode). Additionally, or alternatively, based on causing suppression of the engine mode, the controller 118 may transmit the request for recharging of the battery 108. Additionally, or alternatively, the controller 118 may transmit the request for recharging the battery 108 responsive to receiving an indication (e.g., a manual indication provided via the user interface) to transmit the request for recharging the battery 108. The request may be for immediate recharging of the battery 108 or for recharging of the battery 108 at a future time that is prior to the estimated time. Moreover, the request may indicate an identifier of the machine 100, a location of the machine 100, and/or the estimated time, among other examples. The controller 118 may transmit the request to a device remote from the machine 100 (e.g., a back office device). The request may cause a charging rover (e.g., an autonomous charging rover) or a non-autonomous charging vehicle to perform recharging of the battery 108.

In some implementations, the controller 118 may receive, from a device remote from the machine 100 (e.g., a back office device), an indication to operate the machine 100 in the engine mode after suppression of the engine mode. In other words, the indication may override a previous suppression of the engine mode. The controller 118 may cause, based on the indication, operation of the machine 100 in the engine mode. In this way, the engine 106 may be started in case of an emergency and/or if the machine 100 is unable to be moved solely by electrical power (e.g., if the machine 100 is down due to high voltage electrical system failure).

The control 202 used to provide the input indicating that the engine mode is to be disabled (or a different control) may also enable an input indicating that the engine mode is to be enabled. For example, an individual may toggle between disabling the engine mode and enabling the engine mode using the control 202. In some implementations, enabling of the engine mode may be permitted at any time after the engine mode is disabled. Alternatively, enabling of the engine mode may be permitted after the engine mode is disabled provided that a condition (e.g., one or more conditions) for permitting the engine mode to be enabled is satisfied. Here, until the condition is satisfied, the controller 118 may disable the control 202 used to provide an input indicating that the engine mode is to be enabled. Additionally, or alternatively, until the condition is satisfied, the controller 118 may reject an input indicating that the engine mode is to be enabled.

The controller 118 may determine that the condition for permitting the engine mode to be enabled is satisfied. The condition may be that a particular time period has elapsed since suppression of operation of the machine 100 in the engine mode, that the machine 100 has traveled at least a particular distance since suppression of operation of the machine 100 in the engine mode, that a location of the machine is outside of an area associated with a zero emissions requirement (e.g., a work site associated with electric-only operation), and/or that a credential (e.g., a password, a digital certificate, or the like), indicating authorization to enable operation of the machine 100 in the second mode, is received, among other examples. Based on satisfaction of the condition, the controller 118 may enable a subsequent input (e.g., by enabling the control 202 used for providing the subsequent input) and/or accept a subsequent input (e.g., a subsequent input provided via the control 202) indicating that the engine mode of the machine 100 is to be enabled.

As described herein, the controller 118 may monitor (e.g., collect and store data) an amount of time that the machine 100 operates in the electric mode, which may indicate whether the machine 100 (or a fleet of machines that includes the machine 100) is meeting an emissions target. The controller 118 may determine that the amount of time is indicative of non-compliance with a standard (e.g., a zero emissions standard, a low emissions standard, an electric mode usage standard, or the like). For example, if the machine 100 operates in the electric mode for less than a threshold amount of an uptime of the machine 100, then the controller 118 may determine that the amount of time is indicative of non-compliance with the standard. The controller 118 may transmit (e.g., to a device remote from the machine 100, such as a back office device) a notification indicating non-compliance with the standard, thereby enabling remedial actions to enforce compliance with the standard.

The controller 118 may provide, via the user interface and based on the amount of time, information indicating whether a proportion of time that the machine 100 has operated in the electric mode meets the target proportion of time that was indicated (e.g., indicating a status of the machine 100 as to meeting the target proportion of time). For example, the information may indicate a total time in which the machine 100 has operated in the electric mode, the proportion of time that the machine 100 has operated in the electric mode, and/or the target proportion of time. Additionally, the information may indicate an amount of fuel savings and/or an amount of emissions savings attributable to operation of the machine 100 in the electric mode. Moreover, the information may indicate a comparison of the amount of time that the machine 100 has operated in the electric mode to amounts of time associated with one or more other machines in a fleet with the machine 100. The controller 118 may also provide the information to a device remote from the machine 100 (e.g., a back office device or a device implementing a database).

The controller 118 may determine that the proportion of time that the machine 100 has operated in the electric mode indicates that the machine 100 will be unable to meet (e.g., is not on track to meet) the target proportion of time. In some implementations, based on determining that the machine 100 will be unable to meet the target proportion of time, the controller 118 may automatically disable the engine mode and/or may prevent enabling of the engine mode after the engine mode is disabled. Additionally, or alternatively, based on determining that the machine 100 will be unable to meet the target proportion of time, the controller 118 may select the machine 100, from a fleet of machines, for operating in an area (e.g., a work site) associated with a requirement of zero emissions, to thereby increase a time of electric mode operation of the machine 100.

In this way, the control system 200 improves operator control over starting of the engine 106, thereby improving operator control over emissions produced by the machine 100.

As indicated above, FIG. 2 is provided as an example. Other examples may differ from what is described with regard to FIG. 2.

FIG. 3 is a flowchart of an example process 300 associated with suppressing switching operation of a machine from an electric mode to an engine mode. One or more process blocks of FIG. 3 maybe performed by a controller (e.g., controller 118). Additionally, or alternatively, one or more process blocks of FIG. 3 maybe performed by another device or a group of devices separate from or including the controller, such as another device or component that is internal or external to the machine 100.

As shown in FIG. 3, process 300 may include causing a machine to operate in a first mode, the machine being configured for hybrid operation in the first mode using a battery without using an internal combustion engine or in a second mode using the internal combustion engine when a level of the battery is below a threshold (block 310). For example, the controller may cause a machine to operate in a first mode, as described above. Process 300 may include receiving an input indicating that the second mode is to be disabled (block 312).

Process 300 may include determining, responsive to receiving the input, an estimated time at which the level of the battery is to be below the threshold, and transmitting, prior to the estimated time, a request for recharging of the battery. Process 300 may include transmitting, responsive to detecting that the level of the battery is below a recharging threshold, a request for recharging of the battery.

As further shown in FIG. 3, process 300 may include determining that the level of the battery is below the threshold (block 320). For example, the controller may determine that the level of the battery is below the threshold, as described above.

As further shown in FIG. 3, process 300 may include selectively causing the machine to switch from operating in the first mode to operating in the second mode based on whether an input indicating that the second mode is to be disabled is received (block 330). For example, the controller may selectively cause the machine to switch from operating in the first mode to operating in the second mode based on whether an input indicating that the second mode is to be disabled is received, as described above. Selectively causing the machine to switch from operating in the first mode to operating in the second mode may include causing, based on receiving the input indicating that the second mode is to be disabled and when the level of the battery is below the threshold, suppression of operation of the machine in the second mode (block 332).

Process 300 may include receiving, from a device remote from the machine, an indication to operate the machine in the second mode after suppression of operation of the machine in the second mode, and causing, based on the indication, operation of the machine in the second mode (block 334). Process 300 may include determining that a condition for permitting the second mode of the machine to be enabled is satisfied, and enabling or accepting, based on satisfaction of the condition, a subsequent input indicating that the second mode of the machine is to be enabled (block 336).

Process 300 may include monitoring an amount of time that the machine operates in the first mode. Process 300 may include receiving an indication of a target proportion of time that the machine is to operate in the first mode, and providing, via a user interface and based on the amount of time, information indicating whether a proportion of time that the machine has operated in the first mode meets the target proportion of time. Process 300 may include monitoring an amount of time that the machine operates in the first mode, determining that the amount of time is indicative of non-compliance with a standard, and transmitting a notification indicating non-compliance with the standard.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The control system described herein may be used with any machine capable of hybrid operation in an electric mode using a battery without using an internal combustion engine or in an engine mode using the internal combustion engine when a level of the battery is below a threshold. For example, the control system may be used in a hybrid electric machine that is to be used in an area (e.g., a work site) associated with a requirement of zero emissions. The control system is useful for facilitating improved control over starting of the engine, thereby improving control over emissions produced by the machine. For example, the control system may cause suppression of operation of the machine in the engine mode even if the level of the battery is below the threshold, thereby reducing emissions produced by the machine and enabling use of the machine in an area associated with a requirement of zero emissions.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A control system, comprising:
  a control of a user interface; and
  a controller configured to:
    cause a machine to operate in a first mode using a battery without using an internal combustion engine;
    receive an input, via the control, indicating that a second mode of the machine is to be disabled, wherein, in the second mode, the machine uses the internal combustion engine when a level of the battery is below a threshold; and
    cause, based on the input and when the level of the battery is below the threshold, suppression of operation of the machine in the second mode.

2. The control system of claim 1, wherein the user interface is on a device remote from the machine.

3. The control system of claim 1, wherein the user interface is on board the machine.

4. The control system of claim 1, wherein the controller is further configured to:
receive, from a device remote from the machine, an indication to operate the machine in the second mode after suppression of operation of the machine in the second mode; and
cause, based on the indication, operation of the machine in the second mode.

5. The control system of claim 1, wherein the controller is further configured to:
determine, responsive to receiving the input, an estimated time at which the level of the battery is to be below the threshold; and
transmit, prior to the estimated time, a request for recharging of the battery.

6. The control system of claim 1, wherein the controller is further configured to:
determine that the level of the battery is below the threshold prior to causing suppression of operation of the machine in the second mode.

7. The control system of claim 1, wherein the controller is further configured to:
receive an indication of a target proportion of time that the machine is to operate in the first mode;
monitor an amount of time that the machine operates in the first mode; and
provide, via the user interface and based on the amount of time, information indicating whether a proportion of time that the machine has operated in the first mode meets the target proportion of time.

8. A method, comprising:
causing, by a controller, a machine to operate in a first mode using a battery without using an internal combustion engine;
determining, by the controller, that a level of the battery is below a threshold; and
selectively causing, by the controller, the machine to switch from operating in the first mode to operating in a second mode based on whether an input indicating that the second mode is to be disabled is received, wherein, in the second mode, the machine uses the internal combustion engine.

9. The method of claim 8, further comprising:
receiving the input indicating that the second mode is to be disabled.

10. The method of claim 9, wherein selectively causing the machine to switch from operating in the first mode to operating in the second mode comprises:
causing, based on receiving the input indicating that the second mode is to be disabled and when the level of the battery is below the threshold, suppression of operation of the machine in the second mode.

11. The method of claim 10, further comprising:
receiving, from a device remote from the machine, an indication to operate the machine in the second mode after suppression of operation of the machine in the second mode; and
causing, based on the indication, operation of the machine in the second mode.

12. The method of claim 10, further comprising:
determining that a condition for permitting the second mode of the machine to be enabled is satisfied; and
enabling or accepting, based on satisfaction of the condition, a subsequent input indicating that the second mode of the machine is to be enabled.

13. The method of claim 12, wherein the condition is that one or more of:
a particular time period has elapsed since suppression of operation of the machine in the second mode,
the machine has traveled at least a particular distance since suppression of operation of the machine in the second mode,
a location of the machine is outside of an area associated with a zero emissions requirement, or
a credential, indicating authorization to enable operation of the machine in the second mode, is received.

14. The method of claim 8, further comprising:
monitoring an amount of time that the machine operates in the first mode.

15. The method of claim 14, further comprising:
receiving an indication of a target proportion of time that the machine is to operate in the first mode; and
providing, via a user interface and based on the amount of time, information indicating whether a proportion of time that the machine has operated in the first mode meets the target proportion of time.

16. A machine, comprising:
a battery;
an internal combustion engine; and
a controller configured to:
cause the machine to operate in a first mode using the battery without using the internal combustion engine;
receive an input, via a user interface associated with the machine, indicating that a second mode of the machine is to be disabled, wherein, in the second mode, the machine uses the internal combustion engine when a level of the battery is below a threshold; and
cause, based on the input and when the level of the battery is below the threshold, suppression of operation of the machine in the second mode.

17. The machine of claim 16, wherein the user interface is on a device remote from the machine.

18. The machine of claim 16, wherein the controller is further configured to:
receive, from a device remote from the machine, an indication to operate the machine in the second mode after suppression of operation of the machine in the second mode; and
cause, based on the indication, operation of the machine in the second mode.

19. The machine of claim 16 wherein the controller is further configured to:
transmit, responsive to detecting that the level of the battery is below a recharging threshold, a request for recharging of the battery.

20. The machine of claim 16, wherein the controller is further configured to:
monitor an amount of time that the machine operates in the first mode;
determine that the amount of time is indicative of non-compliance with a standard; and
transmit a notification indicating non-compliance with the standard.

* * * * *